United States Patent [19]
Richart

[11] Patent Number: 5,163,603
[45] Date of Patent: Nov. 17, 1992

[54] PROCESS OF MANUFACTURING HOLLOW TRIANGULAR UPPER CONTROL ARM

[75] Inventor: Leland M. Richart, Redford, Mich.

[73] Assignee: Masco Industries, Inc., Taylor, Mich.

[21] Appl. No.: 850,177

[22] Filed: Mar. 11, 1992

[51] Int. Cl.⁵ ............................... B23K 37/02
[52] U.S. Cl. .......................... 228/141.1; 228/161; 228/174; 228/182; 228/144; 29/163.6; 29/897.2; 280/673
[58] Field of Search ............ 228/144, 149, 150, 161, 228/174, 182, 141.1; 29/163.6, 897.2; 280/666, 667, 670, 673, 696, 701

[56] References Cited

U.S. PATENT DOCUMENTS

| | | | |
|---|---|---|---|
| 1,899,645 | 2/1933 | Sneed | 228/144 |
| 2,127,618 | 8/1938 | Riemenschneider | 113/33 |
| 2,280,016 | 4/1942 | Werdehoff | 280/106 |
| 2,321,832 | 6/1943 | Leighton | 280/666 |
| 2,621,919 | 12/1952 | Utz | 280/666 |
| 2,640,737 | 6/1953 | Reifsnyder | 308/38 |
| 2,784,983 | 3/1957 | Dean | 280/106 |
| 3,209,432 | 10/1965 | Cape | 29/155 |
| 3,314,673 | 4/1967 | Graney et al. | 267/54 |
| 3,411,803 | 10/1968 | Melton et al. | 280/95 |
| 4,016,950 | 4/1977 | Allison | 280/674 |
| 4,192,396 | 3/1980 | Austerman, Jr. et al. | 280/663 |
| 4,732,819 | 3/1988 | Komuro | 280/785 |
| 4,798,396 | 1/1989 | Minakawa | 280/673 |
| 4,967,473 | 10/1990 | Wessel | 29/897.2 |

Primary Examiner—Samuel M. Heinrich
Attorney, Agent, or Firm—Edgar A. Zarins; Malcolm Sutherland

[57] ABSTRACT

An upper control arm for a vehicle suspension system having a modulus section of hollow construction for reduced weight. The modulus section of the control arm is of a stamped and welded construction thereby eliminating material weight while reducing the cost of manufacturing. The modulus section has a substantially triangular configuration with a reinforced rim flange along the high compression stress area of the control arm elbow. The reinforced rim flange improves the strength of the control arm without sacrificing the weight reduction provided by the hollow construction. A series of apertures are formed in the control arm to reduce weight and improve the harmonic resonancy of the control arm.

4 Claims, 1 Drawing Sheet

PROCESS OF MANUFACTURING HOLLOW TRIANGULAR UPPER CONTROL ARM

BACKGROUND OF THE INVENTION

I. Field of the Invention

This invention relates to an upper control arm for a vehicle suspension system and, in particular, to a control arm having a modulus section of hollow construction with a rim flange for reinforcement of high load stress areas of the control arm and a series of apertures for improving the harmonic resonancy of the control arm.

II. Description of the Prior Art

Upper control arms are routinely incorporated into the suspension systems of truck and passenger vehicles. The typical control arm is generally U-shaped with a ball joint assembly at the apex of the control arm and pivot bar bushings at the ends of the arm for mounting the control arm to a pivot bar assembly. In the past, the modulus sections between the bushings and the ball joint have been solid sections of cast iron or cast aluminum. It was believed that the traditional cast metal sections were necessary to maintain the integrity of the control arm under the stresses of the suspension system. More recently, the modulus section has been constructed of a steel forging of wire frame design. Although these control arm constructions were strong enough to withstand the stress loads they also were very heavy. In today's vehicle market every aspect of a vehicle is examined for weight reduction.

Recent proposals for reducing the weight of the suspension system include a hollow, two-piece control arm. The square hollow bar section comprises a pair of U-shaped components nested together and double seam welded. Thus, the control arm has double side walls with single upper and lower walls. Although strong and lightweight, the double side walls are not located at the compressive stress areas of the arm where additional strength is required. Moreover, the double seam construction requires precise welding over a curving contour which has not been easy to accommodate. Nevertheless, substantial weight reduction over the solid cross-section of the prior known control arms has been accomplished.

Vehicle ride and handling are directly related to the suspension system. Specifically, noise and vibration within the passenger compartment can be improved through the control arms. In the past the control arm operation has been varied by altering the engineering specifications and chemistry of the bushings used in the control arm. However, such variations are limited.

SUMMARY OF THE PRESENT INVENTION

The present invention overcomes the disadvantages of the prior known control arms for vehicle suspension systems by incorporating a modulus section of hollow construction having a substantially triangular configuration in order to distribute the compressive stress loads associated with the suspension system. An enlarged rim flange at the joint apex of the stamped triangular construction provides improved reinforcement at the high compression stress areas of modulus section.

Typical of control arms, the present invention has a substantially U-shaped configuration with a ball joint assembly at the apex and pivot bar bushings at the ends of the control arm. However, the control arm of the present invention includes a modulus section having a substantially triangular hollow cross-section which reduces the overall weight of the control arm while maintaining strength in key stress areas of the elbow sections. The hollow triangular sections are formed through a stamping process wherein the upper apex of the modulus section incorporates a seam weld to form the triangular cross-section. For increased stiffening and reinforcement, a rim flange is formed along the welded apex seam. This rim flange along the high compression stress ares of the control arm elbow eliminates stress failures along this area and permits double plate FEA modeling resulting in additional load balancing capabilities. For improved resonancy harmonies to adjust noise, vibration and harshness of the ride, the control arm is provided with a plurality of apertures. The number and spacing of the apertures in the triangular modulus sections may be altered to satisfy frequency harmonies between the body chassis, cross member and wheel spindle of the vehicle in accordance with the specifications of the vehicle. Under the process of the present invention, the apertures are pierced in the side walls of the triangular modulus sections during the normal stamping operations.

Other objects, features and advantages of the invention will be apparent from the following detailed description taken in connection with the accompanying drawings.

BRIEF DESCRIPTION OF THE DRAWINGS

The present invention will be more fully understood by reference to the following detailed description of a preferred embodiment of the present invention when read in conjunction with the accompanying drawing, in which like reference characters refer to like parts throughout the views and in which.

DETAILED DESCRIPTION OF A PREFERRED EMBODIMENT OF THE PRESENT INVENTION

Figure 1:
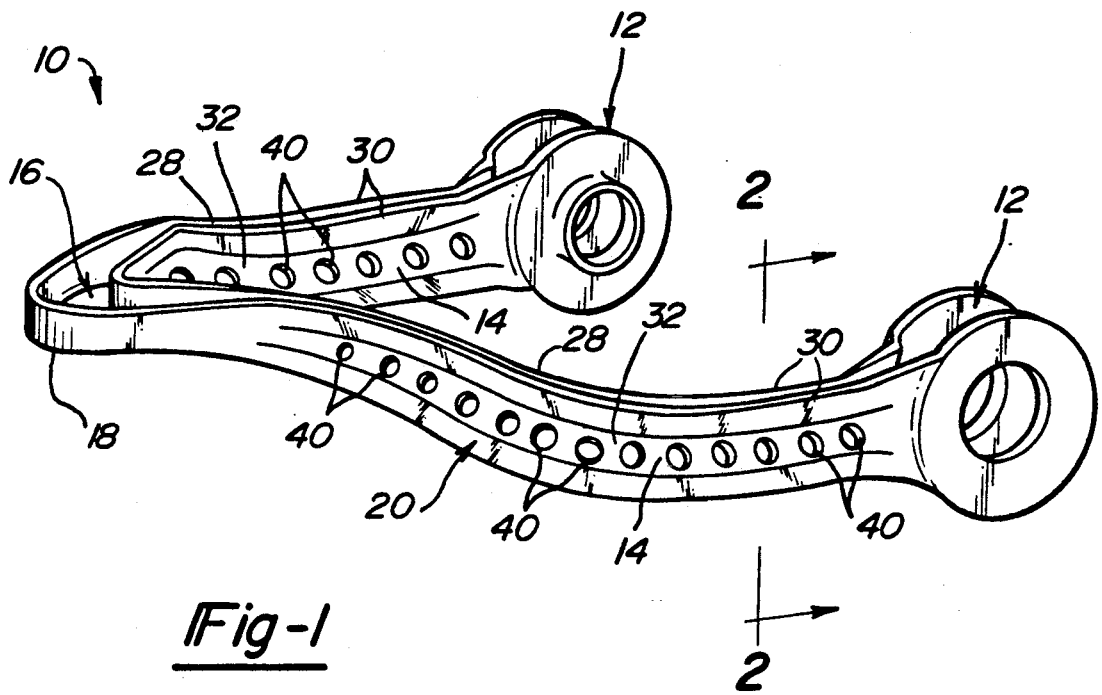
FIG. 1 is an elevated perspective view of a upper control arm for a vehicle suspension system embodying the present invention.
Figure 2:
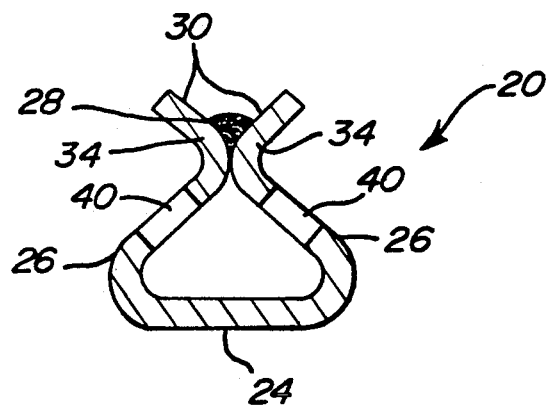
FIG. 2 is a cross-sectional view of the control arm taken along lines 2—2 of FIG. 1.

Referring to FIGS. 1 and 2, there is shown elevational and cross-sectional views of a control arm 10 embodying the principles of the present invention. The control arm 10 is preferably an upper control arm forming a part of a suspension system of a vehicle. As is typical of such components, the control arm 10 has a substantially U-shaped configuration with bushing apertures 12 formed at the ends of the arms 14 and a ball joint receptacle 16 formed at the apex 18 of the control arm 10. The ball joint receptacle 16 is adapted to cooperate with a ball joint assembly (not shown) and may include a ball joint housing integrally formed with the control arm 10. Typical modern control arms 10 incorporate a separate ball joint housing which is inserted into the apex 18 of the control arm 10. The bushing apertures 12 are designed to retain pipe bushings (not shown) for mating engagement with a pivot bar assembly forming a portion of the vehicle suspension system. The pivot bar typically extends through both bushing apertures 12 allowing the control arm 10 to pivot about the assembly in response to road conditions affecting the vehicle suspension system.

The control arm 10 of the present invention is formed of an integral metal stamping to ensure the required structural strength for the suspension system. However, unlike the prior known control arms which incorporate a solid construction, the present invention comprises hollow modulus sections 20 for weight reduction. The control arm 10 includes modulus sections 20 along each arm 14 between the apex 18 and the bushing apertures 12. These modulus sections 20 are subject to extreme compression and tension loads and therefore must have sufficient structural strength to withstand such loads. In order to maintain the structural strength while providing substantial weight reduction, the modulus sections 20 of the control arm 10 of the present invention are provided with a hollow, substantially triangular cross-sectional configuration as best shown in FIG. 2. It has been found that this triangular configuration provides improved strength against the loads while also providing a uniform weld line over the contours of the modulus sections 20 facilitating programmable welding of the seam 22 along the modulus sections 20.

The hollow substantially triangular modulus section 20 of the control arm 10 includes a bottom wall 24 and a pair of side walls 26 brought into mutual contact to form the seam 22 at the upper apex thereof. The triangular configuration provides a balanced construction capable of withstanding the stress loads associated with the suspension system. By locating the weld seam 22 at the apex of the modulus section, a balanced structure is produced creating a predetermined weld pattern readily repeatable using a robotic welder. A series of apertures 40 are formed in the side walls 26 of the triangular modulus section 20 to not only reduce the weight of the control arm 10 but also improve the harmonic resonancy of the suspension system. The placement of the apertures 40 along the arms 14 can be varied to alter the flexibility or resonancy of the control arm 10.

The modulus section 20 of the control arm 10 is formed from an integral stamping having a pair of opposing edges 28. Thereafter, the stamping is bent along substantially parallel lines bringing the edges 28 into mutual contact at the apex of the triangular modulus section. The seam 22 created by the edges 28 is welded to permanently join the side walls 26. Thus, a hollow modulus section 20 of the control arm 10 is formed for reduced weight yet which is capable of withstanding the stress loads associated with the suspension system as a result of the balanced triangular construction. Manufacturing costs are substantially reduced because of the uniform weld pattern of the seam 22.

Initially devised as a means for further reducing the weight of the control arm 10, the plurality of apertures 40 formed in the side walls 26 of the triangular modulus sections 20 also alter the harmonic resonancy of the control arm 10. Under the present process, the apertures 40 may be pierced during initial stamping of the control arm 10. As an alternative, the apertures 40 may be pierced following welding of the modulus sections 20 although some deformation may occur.

The foregoing detailed description has been given for clearness of understanding only and no unnecessary limitations should be understood therefrom as some modifications will be obvious to those skilled in the art without departing from the scope and spirit of the appended claims.

What is claimed is:

1. A process for forming a modulus section of a control arm for a vehicle suspension system, said modulus section forming an integral portion of said control arm comprising the steps of:

stamping a metal body forming an integral portion of said control arm and having a pair of opposing edges;

bending said body along two substantially parallel lines and bringing said edges into mutual contact thereby forming a hollow modulus section having a substantially triangular cross-sectional configuration and a seam;

welding said seam to permanently join said edges, said seam centrally located along said modulus section thereby forming a regular weld line for optimum repeatability in production of the control arms; and piercing a plurality of apertures along said modulus section for improved harmonic resonancy.

2. The process as defined in claim 1 wherein said step of bending forms a bottom wall and a pair of side walls joined at an upper apex of said triangular modulus section forming an upper seam.

3. A process for forming a modulus section of a control arm for a vehicle suspension system, said modulus section forming an integral portion of said control arm, comprising the steps of:

stamping a metal body forming an integral portion of said control arm and having a pair of opposing edges;

bending said body along two substantially parallel lines and bringing said edges into mutual contact thereby forming a hollow modulus section having a substantially triangular cross-sectional configuration with a bottom wall and a pair of side walls joined at an upper apex of said triangular modulus section forming an upper seam;

piercing a plurality of apertures along said modulus section for improved harmonic resonancy; and welding said seam to permanently join said edges, said upper seam centrally located along said modulus section thereby forming a regular weld line for optimum repeatability in production of the control arms.

4. The process as defined in claim 3 wherein said apertures are pierced through said side walls of said modulus section.

* * * * *